United States Patent [19]

Sevrence

[11] Patent Number: 4,657,521
[45] Date of Patent: Apr. 14, 1987

[54] FLEXIBLE CONDUIT
[75] Inventor: Warren E. Sevrence, Lakeland, Fla.
[73] Assignee: Acco Babcock Inc., Fairfield, Conn.
[21] Appl. No.: 588,313
[22] Filed: Mar. 12, 1984
[51] Int. Cl.$^4$ ............................................. F16C 1/10
[52] U.S. Cl. ................................... 464/174; 138/133
[58] Field of Search ............... 138/122, 125, 127, 130, 138/131, 144, 150, 133; 464/174

[56] References Cited
U.S. PATENT DOCUMENTS

| 1,478,083 | 12/1923 | Whitmarsh | 138/127 X |
| 3,015,969 | 1/1962 | Bratz | 138/125 X |
| 3,063,303 | 11/1962 | Cadwallader | 138/125 X |
| 3,188,121 | 6/1965 | Cude et al. | 138/99 X |
| 3,189,053 | 6/1965 | Parr | 138/133 |
| 3,211,823 | 10/1965 | Brown | 138/133 X |
| 4,203,476 | 5/1980 | Vitellaro | 138/133 X |

FOREIGN PATENT DOCUMENTS 416393  9/1934  United Kingdom ................ 464/174

Primary Examiner—Stephen Marcus
Assistant Examiner—Mark Thronson
Attorney, Agent, or Firm—Pennie & Edmonds

[57] ABSTRACT

A flexible cable conduit having an anti-friction liner adapted to surround a movable core. The liner in turn is surrounded by a plurality of spiraled lay wires. The lay wires in turn are surrounded by a spiral wound overlap wrap where the wrap comprises a plastic material to provide a sealing means for the conduit and has high tension properties to constrain the wires from moving radially on any bending of the conduit.

4 Claims, 3 Drawing Figures

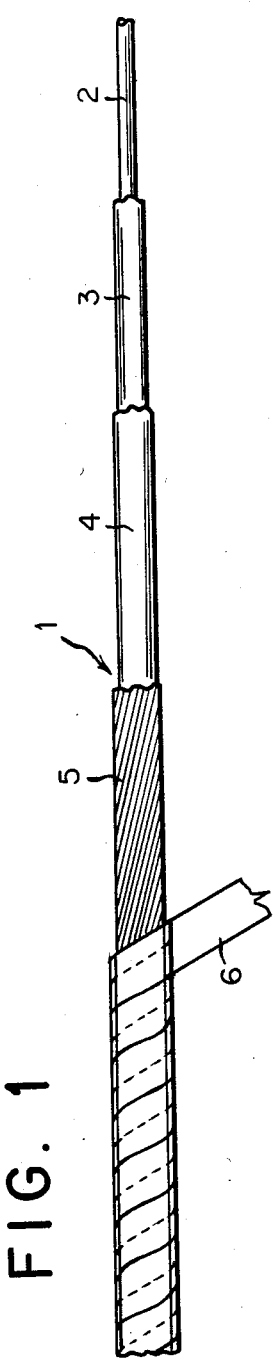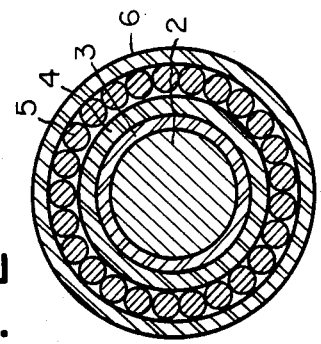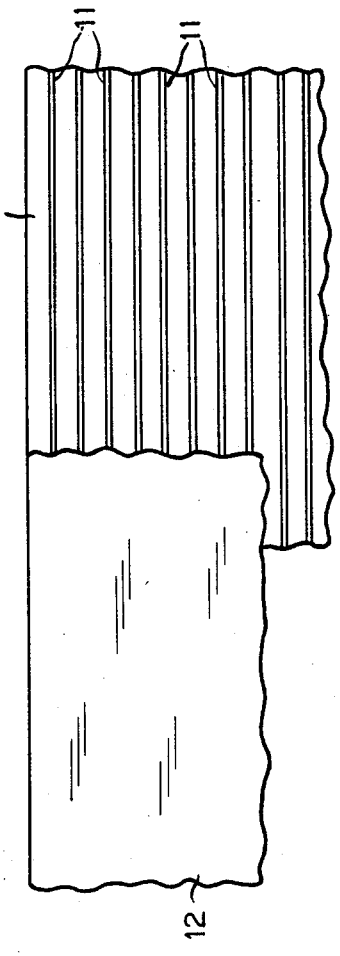

FLEXIBLE CONDUIT

TECHNICAL FIELD

This invention relates to an improved flexible conduit and more particularly to a flexible cable conduit adapted to surround a movable core, for example a control cable.

BACKGROUND OF THE INVENTION

Flexible cable conduits are known which utilize a plastic sheath to surround a control cable and where the sheath in turn is surrounded by a layer of spiraled lay wires. In such installations the plastic sheath serves as an anti-friction element for the control cable while the spiraled lay wires provide strength to the conduit to resist tension and compression loads. The lay wires themselves are enclosed or constructed by wires or rovings to prevent the lay wires from spreading or "bird caging" on application of compression loads to the conduit as may occur when a control cable within the conduit is moved in a direction to produce bends in the conduit. The lay wires along with their constructing wires or rovings in turn may be enclosed in an extruded plastic sheath to seal the lay wires and rovings from moisture. Such a construction is shown in U.S. Pat. No. 3,063,303.

In the type of construction as discussed the use of separate wires or rovings to contain the lay wires and of a separate plastic sheath to provide a seal for the conduit necessarily increases expense of manufacture since separate steps in assembling the plastic sealing sheath and the rovings to the lay wires are required to produce the conduit.

It is therefore an object of my invention to provide for an improved flexible conduit construction wherein assembly of a conduit involving any separate application of an outer sealing sheath and application of wires or rovings to constrain the lay wires of a conduit is eliminated but which at the same time will provide a constraint means for the lay wires as well as a sealing means to impart water tight integrity and protection against foreign materials and abrasion to the conduit.

Further it is an object of my invention to provide for an improved flexible conduit in which the conduit may have a combined sealing means and lay wire constraint means applied in a continuous in-line fabrication resulting in a more economical manufacture of the conduit.

GENERAL DESCRIPTION OF THE INVENTION

Broadly a flexible cable conduit constructed according to my invention comprises a plastic tubular anti-friction liner which is adapted to surround a movable core, for example a control cable. A plurality of closely wound lay wires surrounds the liner to provide strength to the conduit. In addition a tubular plastic sheath may surround the liner to further strengthen the conduit and to provide a structure to withstand compression forces exerted on the liner by the lay wires. The tubular anti-friction liner and outer sheath may together form a composite piece but if desired could be formed by a unitary plastic piece provided the plastic material selected has both an anti-friction property as well as a sufficient strength to withstand compression or crushing pressures exerted by the lay wires. A plastic spiral wound overlap wrap or tape sealingly surrounds the lay wires to prevent radial displacement of the lay wires under compression loads imparted to the conduit and to provide continuous sealing of the lay wires along the length of the conduit.

Preferably the overlap of one wrap with respect to an adjacent wrap is substantially 50% of the width of the wrap to assure sealing.

In addition the wrap preferably has a selfadhesive or pressure sensitive layer on one side thereof so that the wrap may be spirally wrapped around the lay wires in a continuous in-line fabrication.

The wrap also preferably has a plurality of tension resisting threads, for example glass fibers, which extend longitudinally of the wrap in order to add to the strength of the wrap so as to provide the necessary constraint to the lay wires when applied to a sheath in order to prevent any radial displacement of the lay wires upon bending of the sheath.

BRIEF DESCRIPTION OF THE DRAWINGS

FIG. 1 is a side broken view of a flexible conduit constructed according to the invention;

FIG. 2 is an enlarged cross-sectional view of the conduit of FIG. 1; and

FIG. 3 is an enlarged broken plan view of a plastic wrap utilized in sealing the lay wires of the conduit of FIG. 1.

DESCRIPTION OF THE PREFERRED EMBODIMENT

Referring to FIG. 1 there is illustrated a flexible conduit 1 adapted to surround and guide a movable core 2 which is movable longitudinally and/or rotatably with respect to the conduit 1. The core 2 may normally comprise a control cable operatively connecting an operating element, such as an accelerator pedal of an automobile with an operable element, such as a carburetor.

The conduit 1 includes a plastic tubular anti-friction liner 3 made preferably of TFE resin against the sides of which the core 2 may move. The liner 3 in turn preferably has an extruded plastic tubular outer sheath 4 made of a high temperature thermo plastic material to provide protection to the anti-friction liner 3 and to also prevent crushing of the liner 3 upon later application of metal lay wires 5. As shown a plurality of metal lay wires 5 are wound in spiral form about the sheath 4 with the lay wires providing protection against the conduit being crushed as well as providing strength to the conduit to resist tension and compression loads. While the liner 3 and sheath 4 are shown as separate items joined together to form a composite piece, they could be replaced by a single unitary tubular plastic piece provided the plastic material had the anti-friction and strength properties required.

The lay wires 5 are covered by an outer wrap 6 which comprises a plastic tape material which is spirally wound about the lay wires with an appreciable overlap on the order of substantially 50% of the width of the wrap 6. The wrap 6 is a high tensile strength self-sealing tape such that the tape seals upon itself as it is wrapped around the wires 5 to provide a sealing means for the wires and to protect them from moisture, foreign material and abrasion. The high tensile properties of the wrap 6 resist tension forces applied to it which may occur when individual lay wires are forced outwardly due to the conduit 1 being bent. Such bending of the conduit 1 may occur during installation of the conduit between two fixed points or may occur when bending forces are applied to the core control cable 2 and thus to the conduit around it.

Use of the spiral wound wrap as shown in FIG. 1 permits the assembly of the conduit in an in-line manner with the tape being wound around the wires after the wires have been in turn wound onto the extruded sheath 4. Thus the single application of the wrap performs two functions, namely sealing the lay wires and constraining any radial displacement of individual lay wires.

The tape as more fully disclosed in FIG. 3 comprises a layer 10 of a pressure sensitive adhesive which contains a plurality of parallel longitudinally extending threads 11 over which a plastic film 12 extends. A particular tape which I have found applicable for use in a conduit constructed according to the invention is one manufactured by the Devon Tape Corporation of Carlstadt, N.J. as their model #195. This tape comprises a black polyester film having a layer of high tack pressure sensitive adhesive thereon which is reinforced by glass monofilaments. This tape has high scruff and abrasion resistance properties to provide protection to the lay wires against abrasion while the glass threads, 80 per inch, provide necessary tensile strength. The high tackiness of the adhesive as well as the polyester film assure complete sealing of the lay wires to protect them from moisture.

It is seen that a conduit constructed according to the invention eliminates any need of separate assembly of a lay wire constraint means and a sealing means and thus reduces expense of manufacture.

I claim:

1. A flexible cable conduit comprising a plastic tubular anti-friction liner adapted to surround a movable core and a plurality of spiraled lay wires surrounding said liner and adjoining one another; characterized in having a plastic film spiral wound overlap wrap sealingly surrounding said lay wires, without any intervening wires, to prevent radial displacement thereof when said wires are subjected to a compression load and to provide a continuous sealing of said wires along the length of the conduit wherein the overlap of one wrap with an adjacent wrap is substantially 50% of the width of the wrap.

2. A flexible cable conduit according to claim 1 further characterized in that at least one surface of said wrap has a self-adhesive layer thereon whereby overlap portions of the wrap will be affixed to one another.

3. A flexible cable conduit according to claim 1 further characterized in that said wrap has a plurality of tension resisting threads therein extending longitudinally of the wrap.

4. A flexible cable conduit according to claim 1 further characterized in that said liner is surrounded and contacted by a plastic tubular sheath to form a composite piece with said liner, said composite piece being adapted to withstand pressures exerted on said liner by said lay wires.

* * * * *